UNITED STATES PATENT OFFICE.

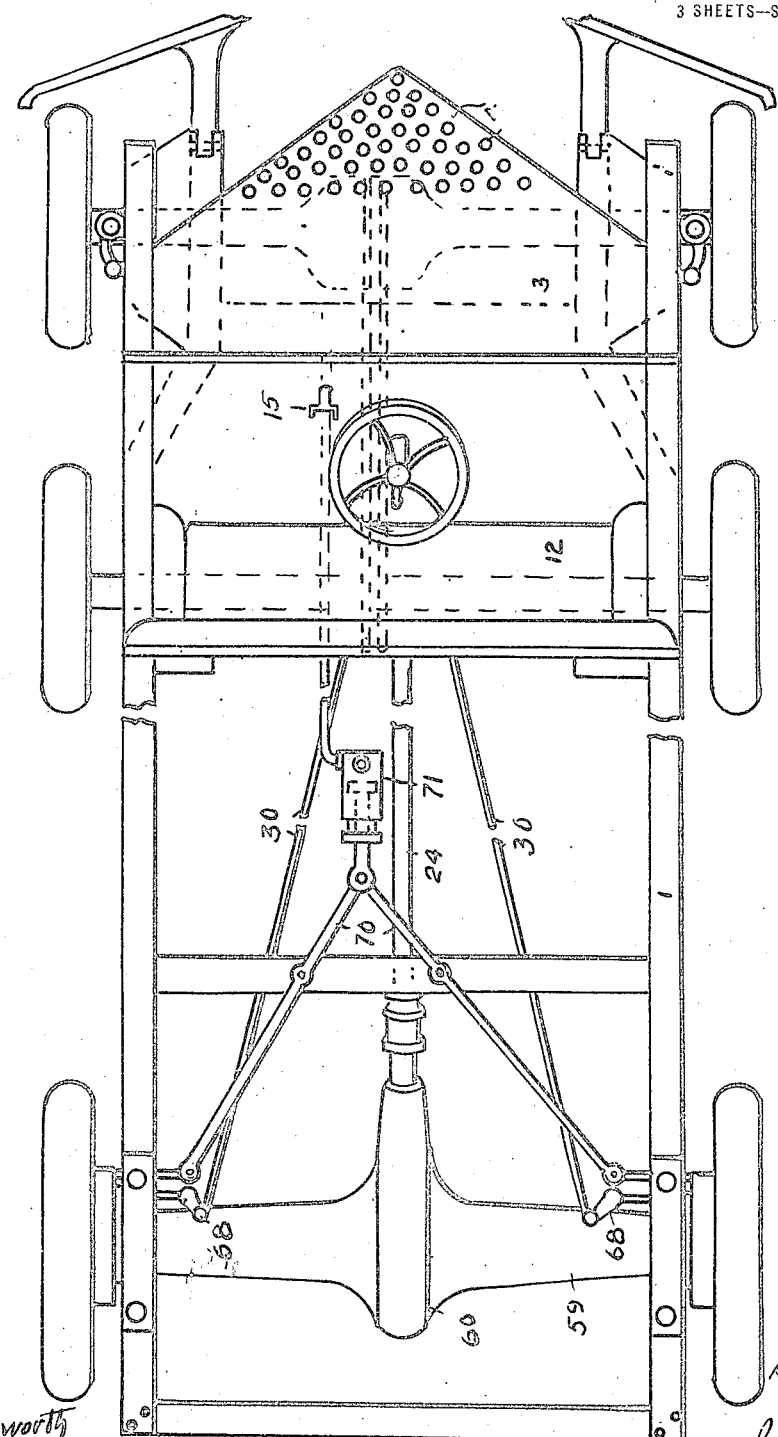

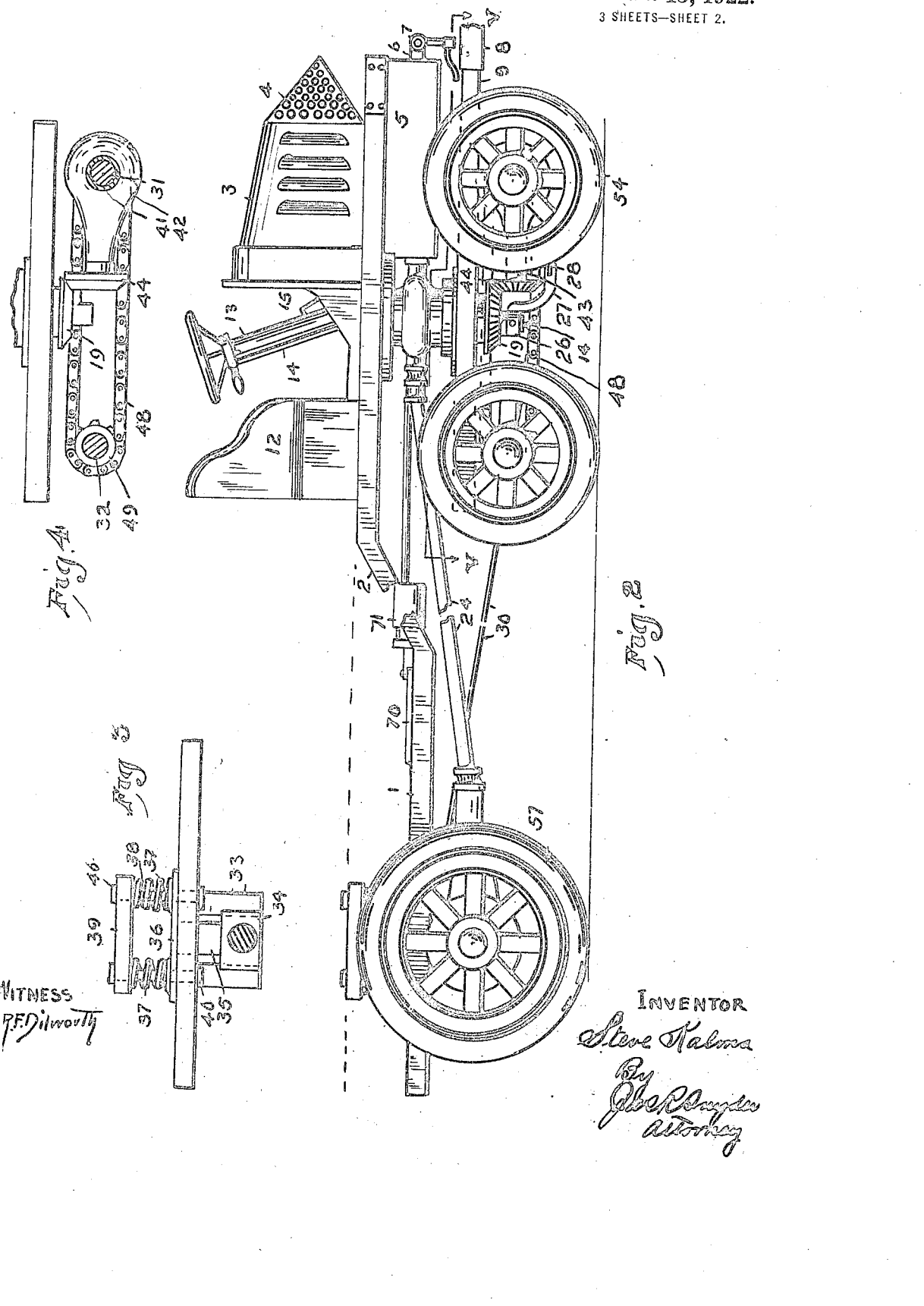

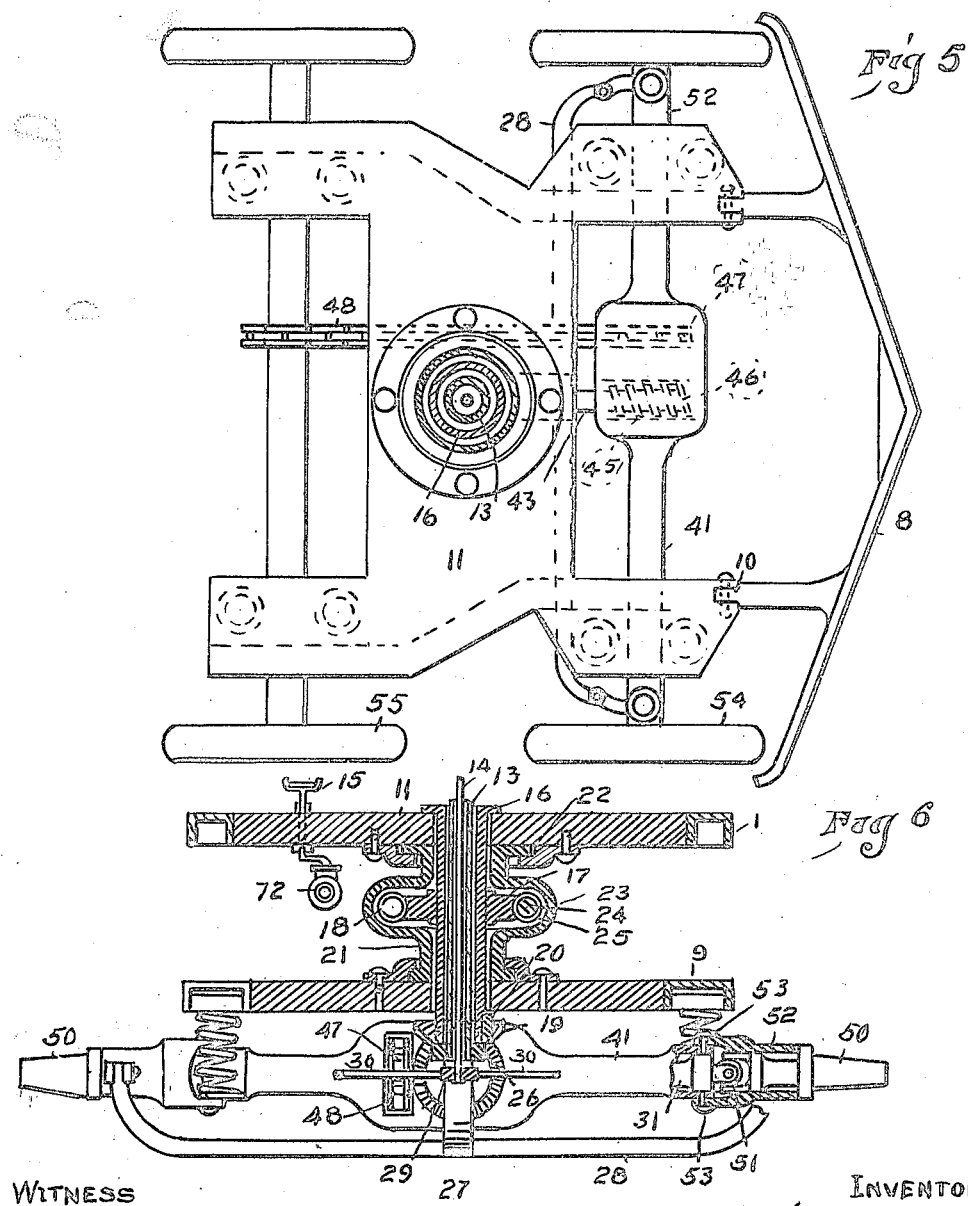

STEVE KALMA, OF BRADDOCK, PENNSYLVANIA, ASSIGNOR OF ONE-HALF TO GEORGE CHUSIR, OF BRADDOCK, PENNSYLVANIA.

AUTOMOBILE.

1,419,266.  Specification of Letters Patent.  Patented June 13, 1922.

Application filed October 12, 1920. Serial No. 416,424.

*To all whom it may concern:*

Be it known that I, STEVE KALMA, a subject of Czecho-Slovakia, residing at Braddock, in the county of Allegheny and State of Pennsylvania, have invented certain new and useful Improvements in Automobiles, of which the following is a specification.

This invention relates to motor vehicles, more particularly motor trucks, but it is to be understood that the invention is designed for any purposes wherein it is found applicable, and has for its object to provide, in a manner as hereinafter set forth, a motor vehicle having means for simultaneously driving from the motor thereof the front and rear axles of the vehicle for traction purposes.

Further objects of the invention are to provide a motor vehicle which is comparatively simple in its construction and arrangement, strong, durable, readily controlled, efficient and convenient in its use, readily assembled and comparatively inexpensive.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1, is a top plan view of a motor vehicle in accordance with this invention.

Figure 2, is a side elevation.

Figures 3 and 4 are details.

Figure 5, is a section on lines V—V Figure 2.

Figure 6, is a sectional elevation.

Referring to Figures 1 to 6, inclusive, of the drawings the adaptation of the invention is shown as applied to a six wheeled truck and 1 denotes the chassis or truck frame or body portion of the vehicle and which is so set up that the forward portion thereof extends in a plane above the plane of the rear portion. The forward portion of the frame 1 is connected with the rear portion thereof by a downwardly depending and inclined intermediate portion 2. See Figure 2. On the forward portion of the frame 1 is mounted a motor, not shown, of known construction and which is enclosed by a hood 3, having its forward end pointed and perforated, as at 4. A casing 5 also encloses the motor. The shaft of the motor is indicated at 6, and the shaft and crank for cranking the motor is indicated at 7. At the forward end of the frame 1, fenders are arranged, as at 8, but they are connected to a front truck 9, as at 10.

The forward portion of the frame 1 is provided with a floor or platform 11, on which is mounted a driver's seat 12, and also through which extends a steering post 13, a clutch lever 14, and a foot operated clutch lever 15.

Interposed between the front truck 9 and the platform 11, as well as extending through said truck 9 and platform 11, is a hollow shaft 16, driven from a worm wheel 17, which is engaged and operated by a worm 18, carried by the motor shaft 6. The lower end of the shaft 16, below the truck body 9, is provided with a bevel gear 19. Fixedly secured at its lower end, as at 20, is a housing 21, which encloses the shaft 16, and is swively connected at its upper end, as at 22, to the lower face of the platform 11. Under such conditions the forward truck 9 is pivotally connected with the frame 1, and can swing or pivot relatively thereto, when occasion requires. The housing 21, intermediate its ends is enlarged, as at 23, and the said enlarged portion at the front of one side is provided with an opening so that the motor shaft 6 can extend into the housing 21 to mesh with the worm wheel 17, and the said enlarged portion of the housing at the other side thereof has its rear provided with an opening so that the drive shaft for the rear axle can extend therein. The drive shaft for the rear axle is indicated at 24, and is provided with a worm 25, which meshes with the worm wheel 17.

The steering post 13 extends down through the shaft 16, and has its lower end provided with a collar 26, having projecting therefrom a curved arm 27, to which is fixed a shifting bar 28.

The lever 14 is extended down through the steering post 13 and terminates in a cross head 29 to which is attached a pair of rearwardly extending brake actuating arms 30.

The rear of the body 1 is provided with two pair of depending guide arms 33, see Figure 3. Between each pair of guide arms is slidably mounted a bearing element 34, for one end of an axle. The bearing element is supported by a spring controlled hanger arm 35, which extends up through the body 1, and is provided with a head plate 36 which is normally seated on the top of the truck 9. Bearing against the plate 36, is a pair of coiled springs 37, which surround a pair of rods 38, connected together by the cross head 39, at the upper ends, and having their lower ends extend down through the plate 36 and top of the truck 9. The rods 38, at their upper and lower ends are provided with retaining nuts 40. By the foregoing arrangement the rear axle 56 is resiliently supported, and connected with the body 1.

The forward truck 9, is provided with a front and a rear axle 31, 32 respectively, and interposed between said axles 31, 32 and the truck 9, are coiled springs. These springs are arranged at the front and rear of said axles.

The front axle 31 is enclosed by a housing 41, which has an enlarged central portion 42, provided with a pair of openings. Into one extends a drive shaft 43 for the axle 31. The shaft 43 has a bevelled gear 44, which meshes with the bevel gear 19, and the shaft 43 is furthermore provided with a worm 45 which engages with a worm wheel 46, on the axle 31 for driving the latter. The axle 31 is further provided with a sprocket wheel 47 for driving a transmission belt 48. The latter extends to the axle 32 and engages a sprocket wheel 49 on the axle 32 for the purpose of driving it. The belt 48 extends rearwardly from the axle 31 and through the other opening in the enlarged portion 42, of the housing 41.

The axle 31 at each end is provided with a spindle 50, which is connected to the axle body by a universal connection or joint 51, whereby the spindles 50 can be shifted relatively to the axle body. The housing 41 at each end is provided with a sleeve 52, which is hinged to the housing, as at 53, and by this arrangement the sleeves 52 can be shifted relatively to the housing 41. The sleeves extend over a portion of the spindles 50 so that when the sleeves are shifted the spindles will be carried therewith.

The shifting bar 28 is connected to the sleeves 52 so that when the steering post 13 is turned the bar 28 will be actuated and the sleeves 52 turned carrying the spindles 50 therewith, as well as the front wheels 54 which are mounted on the spindles 50.

The rear axle 32 of the truck 9 is provided with wheels 55, and which are driven simultaneously with the driving of the front wheels.

The rear axle 56 is adapted to have clutched therewith, by any suitable means, the rear wheels 57. The hubs of the latter which extend inwardly are indicated at 58. The rear axle 56 is enclosed by a housing 59, having an enlarged central portion 60, into which extends the drive shaft 24. The latter engages with a transmission, not shown, within the enlarged portion 60.

Associated with each inwardly extending portion of the hubs is a brake 69, actuated by a pair of lever arms 70, operated from a fluid pressure brake cylinder 71, which is controlled by an operating valve 72, actuated by the foot lever 15.

What I claim is:—

1. A motor vehicle comprising a chassis, a motor arranged at the forward end of the chassis, a truck arranged below the forward portion of the chassis and connected therewith, a pair of axles supported from the truck, a vertically disposed operative drive connection between said motor and one of the axles of the truck, an operative drive connection between said axles, a rear axle supported from the rear of the chassis, and an operative drive connection for the rear axle extended from said vertically disposed operative drive connection.

2. A motor vehicle comprising a chassis having its forward portion arranged above the rear portion thereof, a motor mounted on the forward end of the chassis, a truck positioned below the forward portion of the chassis and connected therewith, a front and rear axle supported from the truck and said front axle provided with steering knuckles, a vertically disposed operative drive connection between said motor and one of the axles of the truck and extended down through the truck, a rear axle supported from the rear of the chassis, an operative drive connection for the rear axle extended from said vertically disposed drive connection, and a steering mechanism extended down through said vertically disposed operative drive connection and connected with the front axle of the truck.

3. An automobile comprising a chassis, a truck arranged below the forward portion thereof, a motor supported by the forward portion of the chassis, a vertically disposed driving element supported from the forward portion of the chassis and extended down through the truck and operatively connected with the motor, a front and rear axle supported from the truck, said front axle provided with steering knuckles, an operative drive connection between said vertically disposed driving element and the front axle of the truck, an operative drive connection between the front axle and the rear axle of the truck, an axle supported from the rear of the chassis, an operative drive connection between said last mentioned axle and said vertically disposed driving element, and a steering mechanism extended down through said vertically disposed driving element and connected with the front axle of the truck.

4. An automobile comprising a chassis, a truck arranged below the forward end thereof, a motor supported by the chassis, a vertically disposed driving element supported from the chassis and extended down through the truck and having a peripheral gear, an operative drive connection between the motor and said gear, a rear axle supported from the rear of the chassis, said front axle provided with steering knuckles, an operative drive connection between said gear and said rear axle, a front and rear axle supported from the truck, an operative drive connection between said element and said front axle, and a steering mechanism extended down through said element and connected with said front axle.

5. An automobile comprising a chassis, an axle supported from the rear thereof, wheels mounted on said axle, a truck arranged below the forward portion of the chassis and connected therewith, a motor supported by the chassis, a pair of axles supported from the truck, wheels on said axles, a vertically disposed driving element depending from the chassis, an operative drive connection between the motor and said driving element, an operative drive connection between said driving element and said rear axle, and an operative drive connection between said driving element and one of the axles of the truck.

In testimony whereof I affix my signature.

STEVE KALMA.